United States Patent [19]

Mattson

[11] Patent Number: 4,816,198
[45] Date of Patent: Mar. 28, 1989

[54] PROCESS FOR CURING THICK-WALLED ARTICLES

[75] Inventor: William F. Mattson, Hinckley, Ohio

[73] Assignee: The Uniroyal Goodrich Tire Company, Akron, Ohio

[21] Appl. No.: 102,956

[22] Filed: Sep. 30, 1987

Related U.S. Application Data

[63] Continuation-in-part of Ser. No. 704,850, Feb. 25, 1985, abandoned.

[51] Int. Cl.$^4$ ............................................. B29C 35/02
[52] U.S. Cl. .................................... 264/40.6; 264/315; 264/325; 264/326; 264/501; 264/570
[58] Field of Search ...................... 264/315, 326, 40.6, 264/325, 501, 570

[56] References Cited

U.S. PATENT DOCUMENTS

| 3,489,833 | 1/1970 | Lehnen | 264/315 |
| 3,632,712 | 1/1972 | Miller | 264/315 |
| 3,718,721 | 2/1973 | Gould et al. | 264/40.6 |

Primary Examiner—Jan H. Silbaugh
Assistant Examiner—Neil M. McCarthy
Attorney, Agent, or Firm—Alfred D. Lobo; John D. Haney; Alan A. Csontos

[57] ABSTRACT

The heat-sink capacity of a thick-walled article being cured with a hot liquid supplying heat to one side of the wall, allows the point of least cure (PLC) to receive a higher rate of cure equivalents even after the hot liquid is replaced with a cold liquid. In the mean while, on the other side of the wall continues to be heated. Because such a change-over is effected before the PLC has received the minimum number of cure equivalents required to effect a cure at the PLC (a "pre-cure change-over"), a valving arrangement is provided which allows the changeover to be effected without permitting a pressure drop in the bladder sufficient to permit the tire to "blow" because it is as yet uncured when the change-over is effected. Such a pre-cure change-over cannot be made when steam is replaced with water at ambient temperature.

6 Claims, 3 Drawing Sheets

PROCESS FOR CURING THICK-WALLED ARTICLES

This application is a continuation-in-part of U.S. patent application Ser. No. 06/704,850, filed Feb. 25, 1985, now abandoned.

BACKGROUND OF THE INVENTION

This invention relates to utilizing heat transfer equations to trade profitably upon the poor conductivity of porous uncured elastomers and the high conductivity of a metal mold, usually aluminum, in which a thick-walled article of a curable elastomer is cured under high pressure exerted by a hot fluid. By "thick-walled" I refer to a cross-section of elastomer, usually rubber, of sufficient thickness to provide a substantial heat-sink. For example, a green (uncured) tire carcass is cured (vulcanized) in a mold by heating with a fluid-pressurized bladder inserted within the tire, while the outer surface of the tire is heated by contact with the surfaces of a heated mold, usually heated with steam.

More specifically, the invention relates to a process for delivering the optimum number of cure equivalents to an article to be cured, this number of cure equivalents being delivered to the point of least cure (PLC), after the hot pressurized liquid on one surface of the article (the inner surface, say) is replaced with a cold liquid under the same pressure, while the other surface (the outer) is still being heated. The replacement of hot liquid by cold liquid, referred to as "change-over", is effected before the article is removed from the mold, without even momentarily releasing the pressure, and without sensing the temperature at any point within the article while it is being cured.

A "cure equivalent" is defined as one minute of curing time at a constant reference temperature, usually 280° F. The PLC is so referred to because it is the critical point at which the desired number of cure equivalents is to be delivered. When neither more nor less cure equivalents than optimum are delivered to the PLC, the article is said to have had a "perfect cure". Methods of computing the number of cure equivalents to be delivered, or determining the location of the PLC are known and are only incidental to the present invention.

Since the pressure within the bladder is to be maintained when the temperature is quickly dropped, it will be evident that the process of this invention can only be practiced with a hot liquid being circulated in the bladder, and not steam.

The article may be a tire, snubber for a shock absorber, cushioning blocks for rairoad siding blocks, expansion joints for decks and bridges, molded railroad crossing beds, or any article of arbitrary shape, provided its thickness is sufficient to benefit from the lag time for the transfer of heat through a highly conductive metal mold. This lag time is a function of the physical properties of uncured elastomer, of the mold, the temperature and pressure of the curing fluids, and the unsteady state heat transfer relationships which control the curing of the article. Further reference to the article will be made by specifying a tire, more specifically an automobile, truck or "off-the-road" (OTR) tire in which the carcass has substantial thickness and the road-contacting portion, including the tread, is usually at least about 0.50 inch (about 12 mm) thick.

It has long been recognized that a hot tire, freshly removed from a curing mold continues to cure while it is cooling, though the temperature at the PLC begins to fall as soon as the tire is removed from the mold. More correctly, a tire is typically over-cured in areas closest to the heat sources even when the perfect cure is achieved at the PLC, and continues to overcure while cooling. Conventionally, to avoid excessive overcuring of a carcass, a cured carcass is removed from a curing press, rapidly mounted upon a former, inflated and left to cool to room temperature before it is discharged onto a conveyor for sorting, storage and shipping. Excessive overcuring of the carcass is far more deleterious than that of the tread, and it is fortunate that the geometry of a tire is such that in my process, the extent of overcuring the tread due to continued heating after the change-over, is no greater than it is in a conventional curing process.

A particular utilization of lag time is made in the curing of a rubberized nylon cord carcass as taught in U.S. Pat. No. 3,718,721 to Gould et al where the mold heating means is rendered inoperative when a predetermined state of cure has been reached. As clearly pointed out in col 5, lines 44-49, a satisfactory state of cure is reached and opening of the press is initiated when the comparison of the measured temperature with the reference temperature of cure and the elapsed time of cure indicates that the state of cure is such that no porosity will develop in the tire upon release of pressure within the press.

Obviously, if the state of cure is such that the tire will "blow" if the pressure is released, the tire will be destroyed. A tire is said to "blow" when its state of cure is such that enough gases (air, and those generated by the vulcanization reaction) are trapped within the rubber to expand the body, often with too great a force to be contained because the rubber is not sufficiently cured. When sufficiently cured, even if the optimum number of cure equivalents is not as yet delivered to the PLC, most of the entrapped gases have escaped through vents in the mold, the matrix of rubber is substantially thoroughly reinforced by virtue of the crosslinking of polymer chains, and releasing the pressure does not produce significantly greater porosity than that of properly cured rubber.

Thus, Gould et al teach that when a predetermined overall change in the total state of cure has been achieved, the computer actuates a valve mechanism which controls the steam supply to shut it off. At such an instant, the computer actuates a mold-opening mechanism and the completed tire is removed (see col 5, lines 13-19). Obviously, if at the instant the mold-opening mechanism is actuated, the temperature at any point in the tire is above that at which the tire will blow, the tire will be destroyed. Even if the mold was not opened, the cold flood could only be initiated after the cure was past the point when porosity would develop when the pressure was released. In other words, the mold could be cold-flooded only after the risk of blowing the tire had abated. This risk was a necessary consequence of having to release pressure, if only instantaneously, to make the change from a steam supply to a cold flood. It was only upon completion of the change-over that a cold flood could be initiated within the press to cool the tire. In so doing, namely cold flooding the mold immediately upon negating the risk of blowing the tire, they found a way of profitably utilizing that portion of the lag time which allowed stored heat to be utilized to set the nylon cords and minimize distortion of the carcass.

It was essential that the point where porosity would develop be passed before the change-over from saturated steam to cold water, because the sudden change in temperature will necessarily produce too great a drop in the vapor pressure of the saturated steam. If, for example, saturated steam at 200 psig (1479 kPa) and 388° F. (198° C.) was replaced by water at 100° F. (37.8° C.) before the rubber was cured to a point where porosity would develop because the rubber was as yet uncured, the pressure drop would be so great that the tire would blow. This is because the steam in the bladder cannot be instantaneously displaced, and the bladder filled with cold water. In reality, it takes some time to displace the steam from the bladder, and to fill the bladder with water. This is not to say that the steam cannot be first displaced by hot water at the same temperature as the saturated steam, so that there is no drop in pressure, the hot water supply in turn, being then displaced by cold water, referred to as a "cold-flood".

As will presently be evident, a change-over from a hot supply to a cold flood without at least momentarily releasing pressure would not be possible without using a valving sequence described hereinbelow. Making the changeover while the carcass is as yet uncured, and in a state such that the tire will blow upon release of pressure within the press, profitably utilizes the maximum amount of lag time without making any direct measurement of temperature within the curing tire.

The means for tracking the PLC without sensing temperature within the tire is disclosed in U.S. Pat. No. 4,371,483 to Mattson. However, Mattson's interest was sharply focussed upon the problem of mimicing a three-dimensional finite difference program to track the PLC without sensing a temperature within the body. Ten years after Gould et al '721, it was up to Mattson '483 to provide an effective curing process without sensing temperature. The problem he solved was formidable enough without interjecting yet another variable, namely cold flooding one side of the mold, typically the bladder side, while the other side continued to be heated. There was no reason to read past the problems of defining the location of the PLC, and quantifying the number of cure equivalents delivered to that point, which problems were addressed in Gould et al and Mattson, to attempt to address the problem of switching from hot to cold flood substantially instantaneously, without releasing pressure, at a temperature at which the tire would otherwise blow.

SUMMARY OF THE INVENTION

It has been discovered that the lag time in the curing of a tire, may be used to advantage to provide the desired cure equivalents while the tire is still being cured in the mold, by replacing the hot fluid with a cold fluid without releasing the high pressure of curing fluid even momentarily. Such replacement is accomplished prior to the time when the desired number of cure equivalents are delivered to the point of least cure, and while the temperature at that point is high enough to "blow the tire" if the pressure is released because trapped gases would generate porosity.

It is therefore a general object of this invention to provide a process for curing a shaped article of a curable elastomer having a thickness of at least 0.75 inch (about 18 mm) in a mold heated internally and externally with hot curing fluids under a pressure of at least about 100 psig (790 kPa), without measuring any temperature within the body of the article, and by replacing one hot curing fluid with a cold fluid at the same pressure without releasing the pressure even momentarily on one surface of the article, so that curing of the article will progress until the desired number of cure equivalents are delivered to the point of least cure due to continued heating through the other surface.

It is a specific object of this invention to provide means for determining at what point in the curing cycle of an article, the hot curing fluid, whether internal or external, should be replaced with a cold fluid, and means to effect the change substantially instantaneously, though the temperature at any point in the body of the article, at the time the change is effected, is high enough to blow the tire if the pressure is released before the replacement is completed.

BRIEF DESCRIPTION OF THE DRAWINGS

The foregoing and other objects and advantages of my invention will appear more fully from the following description, made in connection with the accompanying drawing of a preferred embodiment of the invention, in which.

DETAILED DESCRIPTION OF A PREFERRED EMBODIMENT

The invention is illustrated with specific reference to the curing of a large (3600×51) off-the-road (OTR) tire in a pot heater. The tire weighs about 5000 pounds (2268 kg). The calculated number of cure equivalents required at the PLC is 30. The PLC is located about 4 ins. radially inward from a point in the shoulder where it contacts the bladder.

The inside of the tire is cured with a water-pressurized bladder heated with a predetermined water-side internal cycle, and the outside of the tire is cured concurrently by heating the mold with steam with a predetermined steam-side external cycle. Three heat-transfer conduit means, used to cure the tire, are identified as follows: (1) a "fill water" line for hot pressurized water, also used for a steam pre-fill to preheat the tire before the hot water fill commences; (2) a hot water circulation loop; and (3) a cold water circulation loop.

To begin with, the time required for each step in the conventional curing cycle of the tire is set forth hereinbelow for the above-identified tire:

|  | Time, min. |
|---|---|
| Internal cycle, water-side | |
| (1) Pre-fill with satd. steam at 388° F. | 10 |
| (2) Fill bladder with water at 335° F. (168° C.) and under 400 psig (2857 kPa) | 15 |
| (3) Begin and maintain circulation of hot water | 755 |
| (4) Blowdown water to recovery tank* | 20 |
| (5) Flush with cold water (20° C.) under 250 psig (1824 kPa) | 10 |
| (6) Flush with gas at (20° C.) under | 10 |

| | Time, min. |
|---|---|
| 250 psig | |
| (7) Blowdown the gas | 20 |
| External cycle, steam side: | |
| (1) Delay | 45 |
| (2) Pressurize with satd. steam at 265° F. (129° C.) | 605 |
| (3) Blowdown the steam | 130 |
| (4) Spray cool the molds with water; external blowdown | 60 |

*The required number of cure equivalents (30) has been delivered to the the PLC when this blowdown period begins. The number of cure equivalents delivered near the inner surface of the tire is 1060.

The total time for a complete cycle is 840 min. The time from commencement of the cure, to the time when blowdown of the hot water begins is 780 min.

Figure 1:
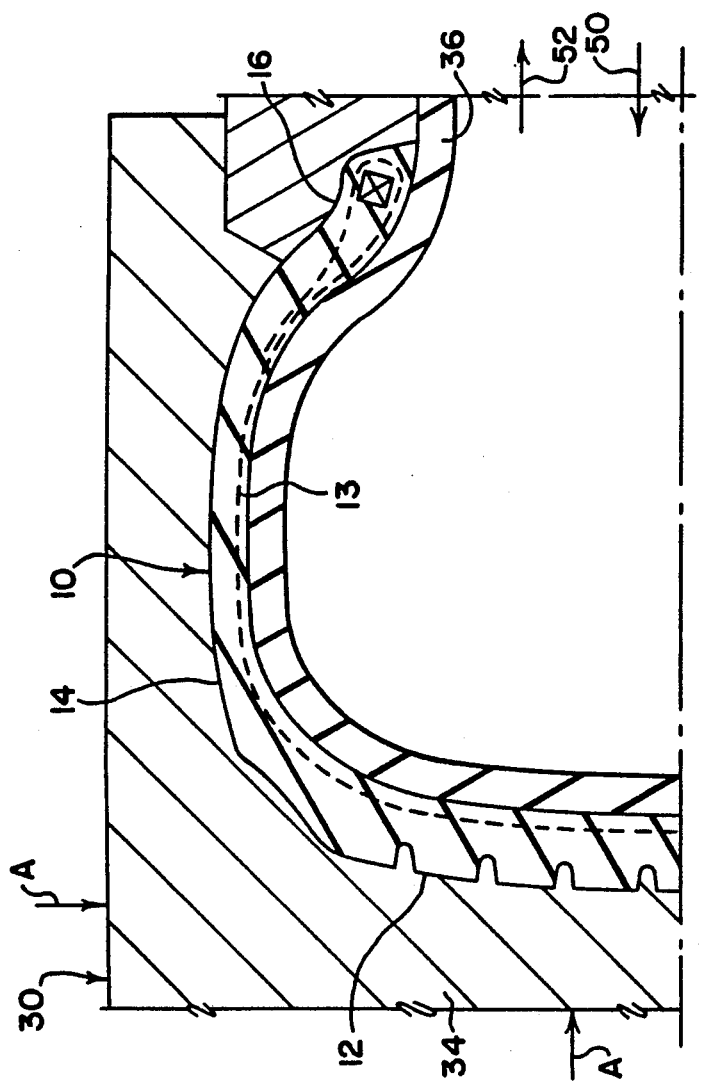
FIG. 1 shows a partial cross-sectional view of a tire in a mold.

Referring now to the drawing, FIG. 1 illustrates a portion of a green tire, indicated generally by reference numeral 10 comprising a rubber tread 12, a body portion 13 made with rubber reinforced with cords, a pair of shoulders 14, one of which is shown, and a pair of bead portions 16, one of which is shown.

The tire 10 is cured in mold 30 comprising an upper mold half 34 and a lower mold half (not shown) which is a mirror image of the upper half. An inflatable bladder 36 is inserted within the tire 10 just prior to the mold halves being tightly pressed against each other.

Hot liquid under pressure is used to transfer heat to the inner surface of the tire. It will be appreciated that in an article other than a tire, the bladder may be provided against an exterior surface while the internal surface is heated. Thus, it suffices that one surface of the article is heated by a hot liquid under pressure, and its opposed surface is heated by any convenient means.

In the description herein, particular reference is made to a tire which is heated with an internal bladder, and heated externally with steam. Conventionally, the hot liquid used is water (also referred to as "hot circulation") at a temperature in the range from about 250° F. (121° C.) to about 500° F. (260° C.), more preferably from about 275° F. to about 450° F., and under pressure of at least 100 psig (790 kPa), preferably from about 200 psig (1480 kPa) to 500 psig (3546 kPa). The change-over is made to cold water (referred to as "cold circulation") at the same pressure as the hot but at ambient temperature. The water is circulated by being introduced through a bladder inlet 50, and being led away through outlet 52. The temperature and pressure of the water, and the time for each portion of the cycle, are conventionally controlled to provide the required number of cure equivalents at the PLC.

Figure 3:
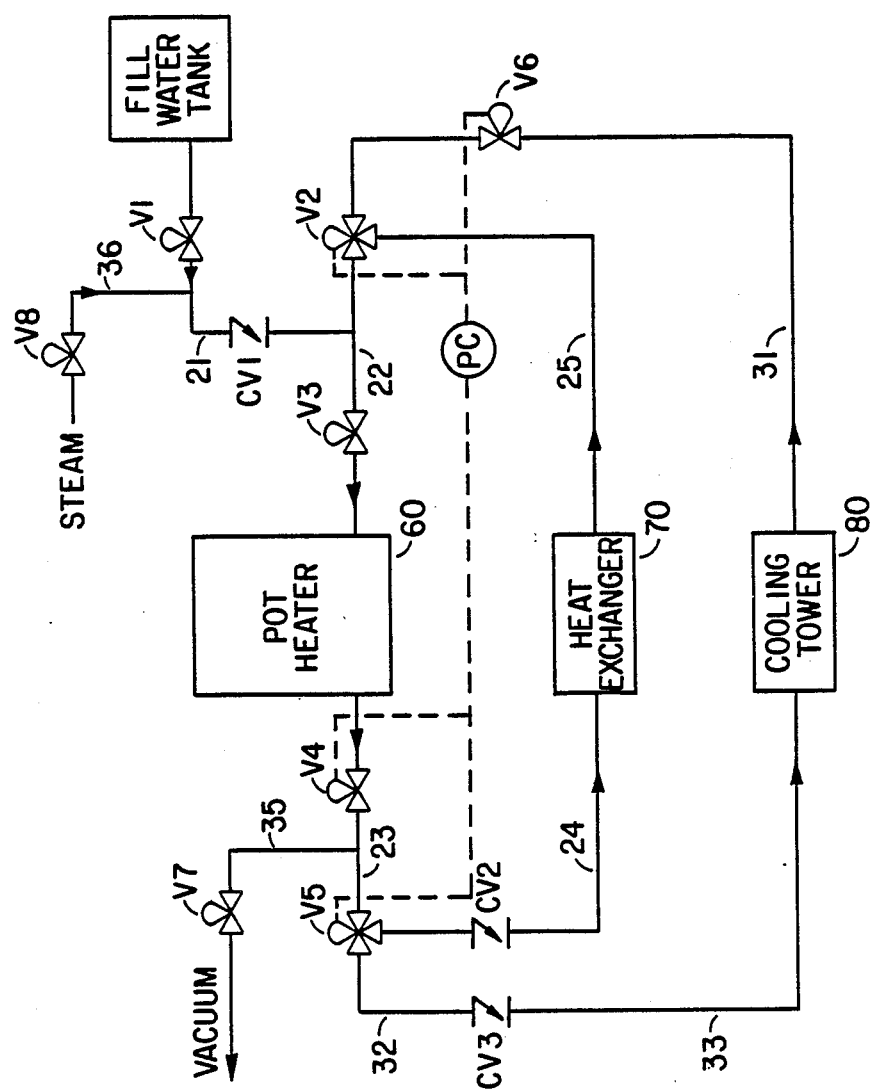
FIG. 3 is a valving diagram schematically illustrating the piping and valving for making a change-over from high pressure hot water to high pressure cold water in the bladder without losing enough pressure to deleteriously affect the curing tire.

Referring to FIG. 3 there is schematically illustrated a valving diagram for pre-filling a bladder with steam to give the tire to be cured a boost, then filling the bladder with hot fill water; thereafter circulating hot water through the bladder; and, finally making the change-over to a cold flood.

To control the curing process, by timing the heating and cooling of the internal surface of the tire requires valving for (a) discontinuing the flow of the hot water while continuing to heat the mold externally, and concurrently making a change-over to a relatively cold water flow by (b) introducing a cold water flow to cool said one surface before the point of least cure receives the required number of cure equivalents sufficient to negate the porosity of the tire, while continuing to heat the mold externally, thus (c) effecting the change-over from hot water to cold water without losing sufficient pressure to permit the rubber to develop porosity, and, (d) continuing to raise the temperature of the point of least cure after effecting the change-over until the required number of cure equivalents are delivered thereto.

The foregoing is simply and elegantly accomplished with:

(1) A fill-water line including a valve V1 flow-controlling hot pressurized water from a fill water tank, a check valve CV1 leading to a supply valve V3 supplying the bladder in a mold (not shown) in the pot-heater, and a return valve V4, downstream of the bladder, which valve is closed to dead-end the fill water. To economize cycle time, a steam pre-fill line communicates with the fill water line just upstream of CV1 so that saturated steam, under a lower pressure than that of delivered fill water, can pressurize and preheat the bladder before the fill water is introduced.

(2) A hot circulation loop including a 'first valve means' collectively referring to a first three-way valve V2, the supply valve V3, and the return valve V4 used to control the back-pressure in supply conduit means 22 while the article is curing but has not received enough cure equivalents at the PLC to preclude blowing the tire, this first valve means being adapted to circulate hot water while continuing to heat the mold externally.

(3) A cold circulation loop including a 'second valve means' collectively referring to the first three-way valve V2, the supply valve V3, the return valve V4, and a second three-way valve V5, this second valve means being adapted to make a timely change-over to the cold water flood. While the change-over from hot liquid to cold flood is made, the back pressure in the supply conduit means, namely, line 22, upstream of V4, is maintained so that the pressure in the bladder is substantially unchanged.

(4) Means to open a cold liquid valve V6 upstream of the first three-way valve V2 before transfer to cold water flow is effected and hot water circulation stops, so as not to lose sufficient pressure in said bladder to cause porosity in the tire. Thus, the cold water valve V6 is opened and flow of hot water is shut off to the bladder before the point of least cure receives the required number of cure equivalents sufficient to negate the porosity of the tire, but the temperature of the point of least cure continues to rise after effecting the changeover until the required number of cure equivalents are delivered thereto, the mold is opened, and the tire is removed from the mold.

In greater detail, first, V1, V2 and V3 are closed, V3 is opened, and steam valve V8 is opened to preheat the bladder and pressurize it to a lower pressure than that at which fill water is to be used. After a few minutes, steam valve V8 is closed and fill water tank valve V1 is opened so that fill water flows through line 21 and check valve CV1 to line 22, and is dead-ended against valve V4.

After some time, hot circulation is initiated by closing V1 and V7 (to vacuum), and opening valves V2, V4 and V5 so that only hot water is transferred to line 22, then circulating through the bladder and mold in pot heater 60. Return valve V4 is in line 24, and a check valve CV2 is provided in line 24, as is a heat exchanger 70. Line 25 returns the water to three-way valve V2, so that lines 22, 23, 24 and 25 together form the hot circulation loop.

Return valve V4 is required to control and maintain the necessary back pressure when the hot fill water is replaced with cold water. Quite unexpectedly, an attempt to maintain the back pressure through three-way valve V5 only, without return valve V4, results in too great a pressure drop during the change. It was found that, when the required pressure is in excess of 200 psig, a pressure drop greater than 10% of the required pressure will result in the tire being destroyed.

Cold water is provided at ambient temperature, usually by cooling tower water at a temperature in the range from about 50° F. to about 100° F., from cooling tower 80. The water is circulated through line 31, controlled by valve V6, then to three-way valve V2, which can be transferred to shut out the hot water from line 25, so that cold water runs through line 22, then through supply valve V3 into the bladder, through return valve V4 in line 23, then through valve V5, line 32, check valve CV3, line 33 and back to the cooling tower to complete the cold water loop.

A blowdown line 35 is provided with a valve V7 leading to a vacuum blowdown. A steam line 36 controlled by steam valve V8, communicates with line 21 to provide a team prefill for the bladder at a reduced pressure relative to the fill-water pressure to be used for curing the tire.

All valves are actuated by a programmable control means 80 conventionally used for this function.

Upon signal from the programmable control means PC, the change-over from the hot water to cold water is made prior to the time when the required number of cure equivalents is delivered to the PLC. This change-over is made by timing valves V6 and V2 to open, and controlling the back pressure with return valve V4 which is partially closed, so that no pressure is lost while the hot water flow from line 25 is transferred to cold water flow. In the meanwhile, the mold continues to be heated by steam in the pot heater so that the external curing of the tire continues after the change-over is made.

The time required for each step in the improved curing cycle of this invention is set forth hereinbelow for the same tire identified hereinabove:

|  | Time, min. |
| --- | --- |
| Internal cycle, water-side |  |
| (1) Pre-fill bladder with satd. steam at 200 psig | 10 |
| (2) Fill bladder with water at 335° F. (168° C.) and under 400 psig (2857 kPa) | 15 |
| (3) Begin and maintain hot circulation | 482 |
| (4) Change-over* to cold water at 90° F. (32° C.) and under 400 psig | 273 |
| (5) Blowdown water to recovery tank* | 30 |
| External cycle, steam side: |  |
| (1) Delay | 55 |
| (2) Circulate satd. steam at 265° F. (129° C.) | 695 |
| (3) Blowdown the steam, spray and drain | 60 |

*The required number of cure equivalents (30) has not been delivered to the the PLC when this change-over is made. The number of cure equivalent delivered near the inner surface of the tire is 510.

The total time for a complete cycle is 810 min. The time from commencement of the cure, to the time when blowdown of the hot water begins is 507 min.

Figure 2:
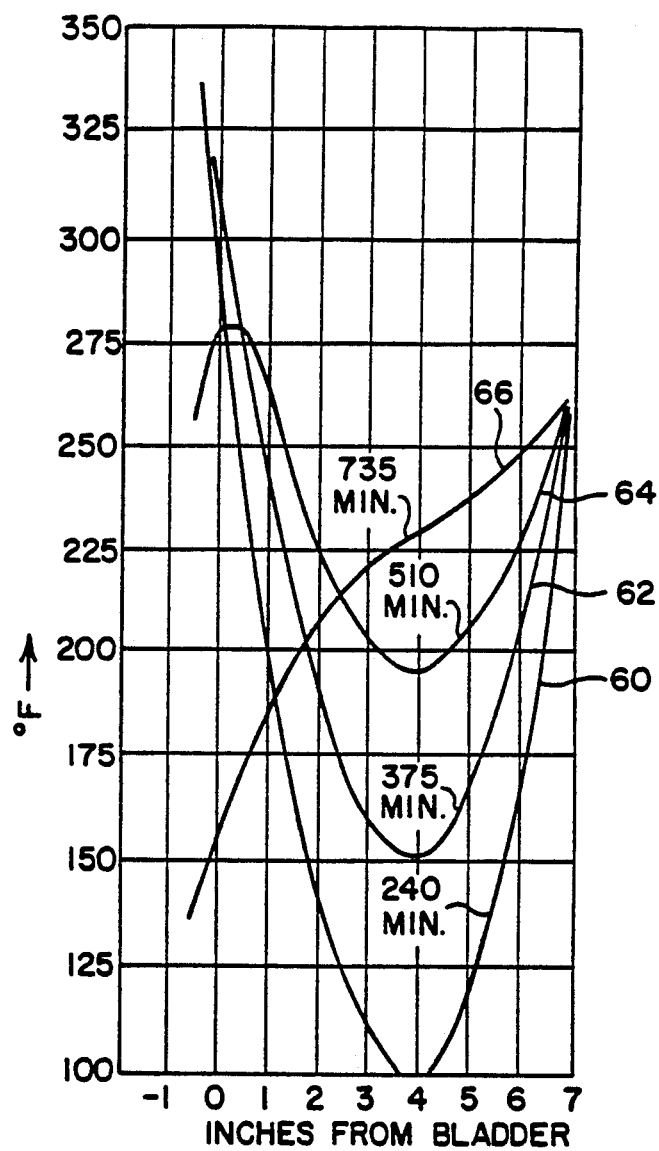
FIG. 2 shows a graph in which the temperature at specific points in the tire are plotted as a function of distance from the bladder after each of four intervals of time after initiation of the curing process.

The heat distribution in the tire being cured is better understood by reference to the graph presented in FIG. 2 in which curves are plotted for the temperature distribution at various points in the shoulder of the tire. The PLC is found to be at a point in the shoulder, about 4 ins. from the inner surface of the tire where it contacts the bladder. The curves represent the temperatures at various points on either side of the PLC while the external curing of the tire continues uninterruptedly.

Curve 60, plotted for 4 hr into the cure, shows that near the inner surface of the tire, each point is at about 270° F. (130° C.). As one follows the curve, proceeding toward the PLC, the temperature is progressively lower, being less than 100° F. (39° C.) at the PLC. Calculation indicates that each point near the surface receives 0.68 cure equivalents per minute while the PLC receives less than 0.001 cure equivalent per minute.

Curve 62, plotted for 6.33 hr into the cure, shows that near the inner surface of the tire, each point is at about 310° F. (154.4° C.). As one follows the curve, proceeding toward the PLC, the temperature is progressively lower, being 152° F. (66.7° C.) at the PLC. Calculation indicates that each point near the surface receives 3.17 cure equivalents per minute while the PLC receives 0.007 cure equivalents per minute.

Curve 64, plotted for 8.5 hr into the cure, soon after the change-over from hot water to cold water is made, shows that near the inner surface of the tire, each point is at about 275° F. (135° C.) As one follows the curve, proceeding toward the PLC, the temperature is progressively lower, being 190° F. (87.7° C.) at the PLC. Calculation indicates that each point near the surface receives 0.82 cure equivalents per minute while the PLC receives 0.03 cure equivalents per minute.

Curve 66, plotted for 12.25 hr into the cure, nearly 4 hr after the change-over, shows that near the inner surface of the tire, each point is at about 160° F. (71° C.). As one follows the curve, proceeding toward the PLC, the temperature is now progressively higher, being 235° F. (112.8° C.) at the PLC. Calculation indicates that each point near the surface receives 0.01 cure equivalents per minute while the PLC receives 0.18 cure equivalents per minute.

As will now be evident, the temperature at the PLC rose after the change-over, and the number of cure equivalents being delivered to the PLC increased, while the number of cure equivalents being delivered to points intermediate the bladder and the PLC decreased. The cure equivalents delivered to the PLC is substantially the same as the number delivered if the change-over had not been made.

As will now also be evident from a comparison of a conventional cure with that of this invention, the number of cure equivalents delivered to the tread of the tire is essentially the same in each case; but over-curing of points within the carcass of the tire is substantially reduced, as is the overall heat requirement and the cycle time, making for a more efficent process, and, at the same time, a better-cured tire.

I claim:
1. In a process for controlling the curing of a thick-walled article located in a cavity in a mold against the surfaces of which cavity said article is to be shaped, molded and cured by a hot liquid under pressure transferring heat to one surface of said article, and by substantially concurrently heating its opposed surface, until the point of least cure within said article has received a predetermined number of cure equivalents required to cure the article to an extent such that no porosity will develop in the article upon release of pressure, the improvement consisting of
(a) discontinuing the flow of said hot liquid while continuing to heat said mold externally of said cavity, and concurrently making a change-over to a cold liquid flow by (b) introducing a cold liquid flow at ambient temperature to cool said one surface before the point of least cure receives the required number of cure equivalents which is sufficient to negate the porosity of said article, while continuing to heat said opposed surface, (c) effecting said change-over from said hot liquid to said cold liquid without losing sufficient pressure to permit said article to develop porosity, and, (d) continuing to raise the temperature of said point of least cure after effecting said change-over until said required number of cure equivalents are delivered thereto while the temperature of said one surface approaches ambient temperature.

2. The process of claim 1 wherein said change-over is effected without losing more than 10% of the pressure at which said hot liquid is introduced.

3. The process of claim 2 wherein said hot liquid is introduced at a pressure in the range from about 100 psig (790 kPa) to about 500 psig (3546 kPa), and a temperature in the range from about 250° F. (121° C.) to about 500° F. (260° C.).

4. The process of claim 2 wherein, before and during step (c), the back pressure in supply conduit means to said bladder is maintained so that the pressure in said bladder is substantially unchanged.

5. The process of claim 3 wherein the wall of said article is at least 0.5 inch (12 mm) thick.

6. The process of claim 5 wherein said article is a tire, said one surface is the internal surface of said tire, said opposed surface is the exterior surface of said tire, and said liquid is water.

* * * * *